United States Patent
Lin et al.

(10) Patent No.: US 8,638,445 B2
(45) Date of Patent: Jan. 28, 2014

(54) IMAGING APPARATUS AND METHOD THEREOF

(75) Inventors: Yu-Hsuan Lin, Tao-Yuan Hsien (TW);
Shih-Yao Pan, Tao-Yuan Hsien (TW);
Hsin-Yueh Sung, Tao-Yuan Hsien (TW);
Alvin Chang, Tao-Yuan Hsien (TW);
Hung-Ta Chien, Tao-Yuan Hsien (TW)

(73) Assignee: Chroma Ate Inc., Tao-Yuan, Hsien (TW)

( * ) Notice: Subject to any disclaimer, the term of this patent is extended or adjusted under 35 U.S.C. 154(b) by 207 days.

(21) Appl. No.: 13/163,862

(22) Filed: Jun. 20, 2011

(65) Prior Publication Data

US 2011/0317169 A1    Dec. 29, 2011

(30) Foreign Application Priority Data

Jun. 29, 2010 (TW) ................................ 99121180 A

(51) Int. Cl.
*G01B 11/02* (2006.01)
(52) U.S. Cl.
USPC .......................................... 356/511; 356/495
(58) Field of Classification Search
USPC ................................................. 356/495, 511
See application file for complete search history.

(56) References Cited

U.S. PATENT DOCUMENTS

| 6,690,473 B1* | 2/2004 | Stanke et al. ................. 356/601 |
| 2010/0128283 A1* | 5/2010 | Liesener et al. .............. 356/511 |
| 2011/0032534 A1* | 2/2011 | Malinovich et al. .......... 356/498 |

* cited by examiner

*Primary Examiner* — Tarifur Chowdhury
*Assistant Examiner* — Jonathon Cook
(74) *Attorney, Agent, or Firm* — Rosenberg, Klein & Lee

(57) ABSTRACT

An imaging apparatus includes a light source; a first beam splitter for reflecting a projection beam emitted by the light source; an objective lens unit including a reflection reference surface for reproducing the projection beam into a measurement beam projected onto an object to generate a first reflection beam and a reference beam projected onto the reflection reference surface to generate a second reflection beam mixing with the first reflection beam and passing through the first splitter and forming an operating beam; a second beam splitter for modulating the operating beam into first and second sub-beams; a monochrome image detection device for passage of the first sub-beam to obtain an interferometric image with monochrome from a first interference region; and an image detection device for permitting passage of the second sub-beam in order to obtain a non-interferometric image from a second interference region.

8 Claims, 7 Drawing Sheets

IMAGING APPARATUS AND METHOD THEREOF

This application claims the benefits of the Taiwan Patent Application Serial No. 099121180 filed on Jun. 29, 2010, the subject matter of which is incorporated herein by reference.

BACKGROUND OF THE INVENTION

1. Field of the Invention

The present invention relates to an imaging apparatus and method thereof, more particularly to a method and an imaging apparatus including monochrome and multi-color image detection devices for scanning an object in order to obtain a 3-dimensional profile image with monochrome or multi-color of the object or a planar distinctive image with monochrome or multi-color of the object.

2. Description of the Prior Art

In the prior art 3-dimensional micro scanning method, an interferometry system is generally applied in order to obtain an image so that the image thus obtained usually consists of interference fringes. Though a 3-dimensional profile of an object to be scanned can be achieved by means of the interferometry system, but we cannot directly detect or measure by the interference fringe or the disadvantages of the 2-dimensional image.

In order to solve the abovementioned problem, two novel methods have been implemented lately; namely: (1) Phase shifting method and (2) Modulating method. FIG. 1 shows a schematic view of a prior art imaging apparatus 100, which includes a light source 11, a beam splitter 12, an interferometer 13, a monochrome camera 14 and an actuator 15. The prior art imaging apparatus 100 is disposed right above an object 200 for scanning the same.

The light source 11 is capable of emitting a projection beam 31. The beam splitter 12 reflects the projection beam 31, thereby forming a reflection beam 32. The interferometer 13 modulates the reflection beam 32 via a reflection reference surface 131 into a reference beam 33 and a measurement beam 34 such that the measurement beam 34 is radiated onto an outer surface of the object 200 to be scanned, reflects back into the interferometer 13, and mixes with the reference beam 33 so as to generate an interferometric beam 35, which pass through the beam splitter 12 and the monochrome camera 14, thereby forming a final image.

During the scanning operation, the actuator 15 activates the interferometer 13 so as to scan the object 200 from different scanning positions, thereby obtaining a series of interferometric image. This series of interferometric image undergoes a prosecution process, which results in a 3-dimensional image of the object 200 to be scanned. Later, after undergoing a combined execution process, a 2-dimensional distinctive image can be obtained when the interference fringes are excluded and this method is known as "phase shifting method". The 2-dimensional image obtained via the phase shifting method does not have color information so that the image is a monochrome image since the objective lens unit provides a relatively small depth of field. Therefore, the topography profile of the 2-dimensional image of the scanned object is distinct due to the scanning operation from the high scan positions while the remaining parts of the 2-dimensional image are blurred.

In the modulating method, after the prior art imaging apparatus 100 obtaining a series of the interferometric image, the actuator 14 shifts and modulates the monochrome camera 14 into a proper imaging position so that the imaging apparatus 100 can obtain the final image, thereby achieving the 2-dimensional distinctive image of the scanned object 200.

In the abovementioned method, since the 3-dimensional profile image and the 2-dimensional image are separately fetched, the entire process includes several extra steps and undesired operations. Thus, the problem of relatively small depth of field and absent of color information in the 2-dimensional image are similarly present in this modulating method.

SUMMARY OF THE INVENTION

Therefore, the object of the present invention is to provide an imaging apparatus and method thereof such that the apparatus includes monochrome and multi-color image detection devices for separately obtaining monochrome interferometric image and a non-interferometric image. The method includes the step of after shifting into several scan positions and detecting execution, a planar distinctive image and multi-color 3-dimensional profile image of an object being scanned can be obtained.

The imaging apparatus of the present invention is used for scanning an object, includes a light source, a first beam splitter, an objective lens unit, a second beam splitter, a monochrome image detection device and an image detection device. The light source emits a projection beam. The first beam splitter reflects the projection beam. The objective lens unit is disposed at an elevation above the object to be scanned, includes a reflection reference surface for modulating the projection beam into a measurement beam and a reference beam. The measurement beam is radiated onto an outer surface of the object to be scanned so as to generate a first reflection beam. The reference beam is radiated onto the reflection reference surface so as to generate a second reflection beam, which mixes with the first reflection beam to pass through the first beam splitter, thereby forming an operating beam. The second beam splitter is disposed at an elevation above the first beam splitter for modulating the operating beam into a first sub-beam and a second sub-beam. The monochrome image detection device is disposed transversely to an optical path of the first sub-beam to obtain an interferometric image with monochrome from a first interference region. The image detection device is disposed transversely to an optical path of the second sub-beam to obtain a non-interferometric image from an outer surface of a second interference region.

In one embodiment of the present invention, the imaging apparatus further includes an actuator coupled operably to the objective lens unit for shifting the same into several scan positions.

In one embodiment of the present invention, the imaging apparatus further includes a reflection member for reflecting the second sub-beam from the second beam splitter onto the image detection device.

Preferably, the image detection device of the present imaging apparatus further includes an extension tube for shifting a focus position of a target image being scanned.

In another embodiment of the present invention, the image detection device is a monochrome image capturing device or a multi-color image capturing device.

An imaging method is applied in the imaging apparatus of the present invention provided with an objective lens unit for scanning an object via the objective lens unit. The image scanning method includes the steps of: shifting the objective lens unit in a predetermined sequence into a plurality of scan positions; the monochrome image detection device detecting the first sub-beam corresponding to a respective one of the scan positions so as to obtain at least one interferometric image with monochrome and a series of the interferometric image with monochrome; the image detection device detecting the second sub-beam corresponding to the respective one of the scan positions so as to obtain a series of the non-interferometric image of the scanned object; executing an surface profile of the interferometric image in order to obtain a 3-dimensional profile image with the monochrome; executing image contrast of the non-interferometric image in order to obtain a plurality of resolution parts from the non-interferometric image, a combination thereof forming a planar distinctive image.

In one embodiment of the present invention, in the event the image detection device is a multi-color image detection device, the method further includes a step of: fetching a color-position information from the planar distinctive image for application in the execution of the 3-dimensional profile image with the monochrome so as to obtain the 3-dimensional profile image with multi colors.

When compared with the prior art imaging apparatus and the method, the present imaging apparatus includes the monochrome image detection device, the image detection device and the second beam splitter, which enables the former two devices to simultaneously form the interferometric image with the monochrome and the non-interferometric image. Thus, after shifting into several scan positions, the 3-dimensional profile image with the monochrome and the planar distinctive image can be simultaneously obtained. In addition, In the event, the image detection device is a multi-color image capturing device, the multi-color planar distinctive image and the 3-dimensional profile image with multi-color can be simultaneously obtained.

In other words, in accordance with the present invention, no additional image scanning actions are required for simultaneously obtaining the color-position information and the 3-dimensional profile image and hence the multi-color planar distinctive image has a relatively high depth of field. When compared with the prior art imaging apparatus and method, the present apparatus can provide more reference information about the object to be scanned.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

The present invention relates to an imaging apparatus and method thereof. More particularly to a method and an imaging apparatus, which includes monochrome and multi-color image detection devices for scanning an object in order to simultaneously obtain a 3-dimensional profile image with multi-color of the object or a planar distinctive image with multi-color of the object. An embodiment is illustrated in the following paragraph in order to better understanding of the present invention. However, the scope of the invention should not be limited only thereto.

Figure 1:
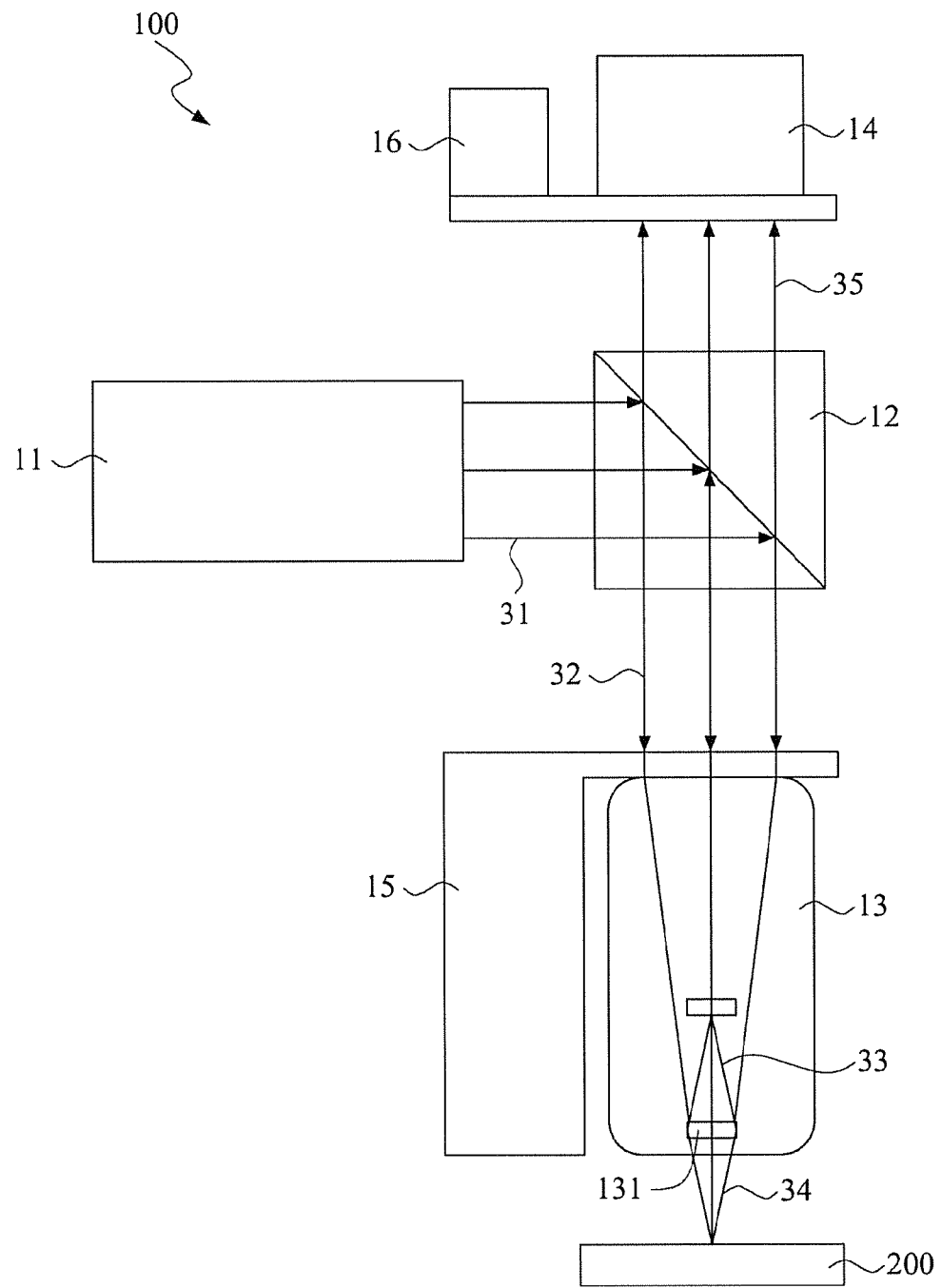
FIG. 1 shows a schematic drawing of a prior art image scanning structure.
Figure 2:
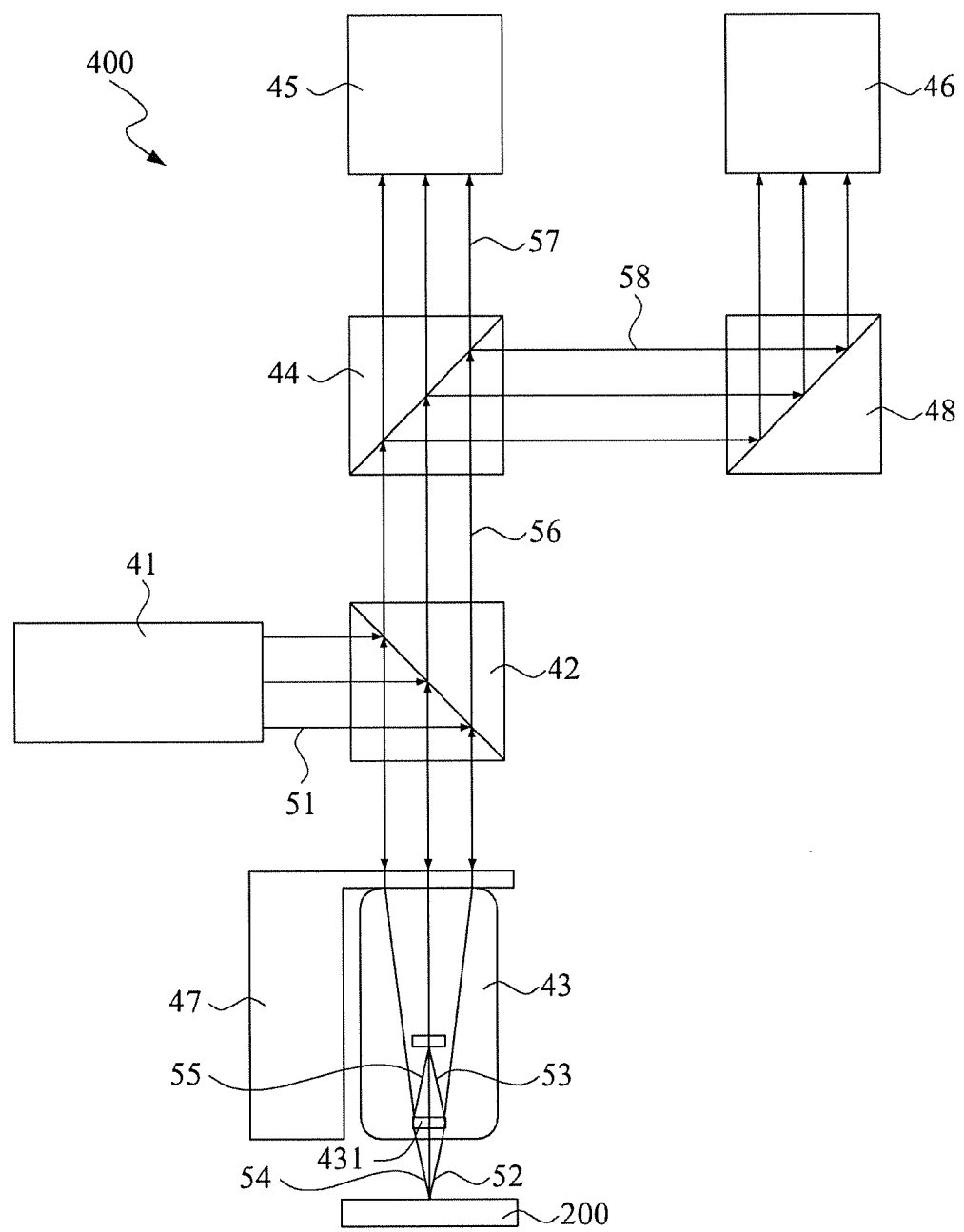
FIG. 2 shows a schematic drawing of an imaging apparatus of the present invention.
Figure 3:
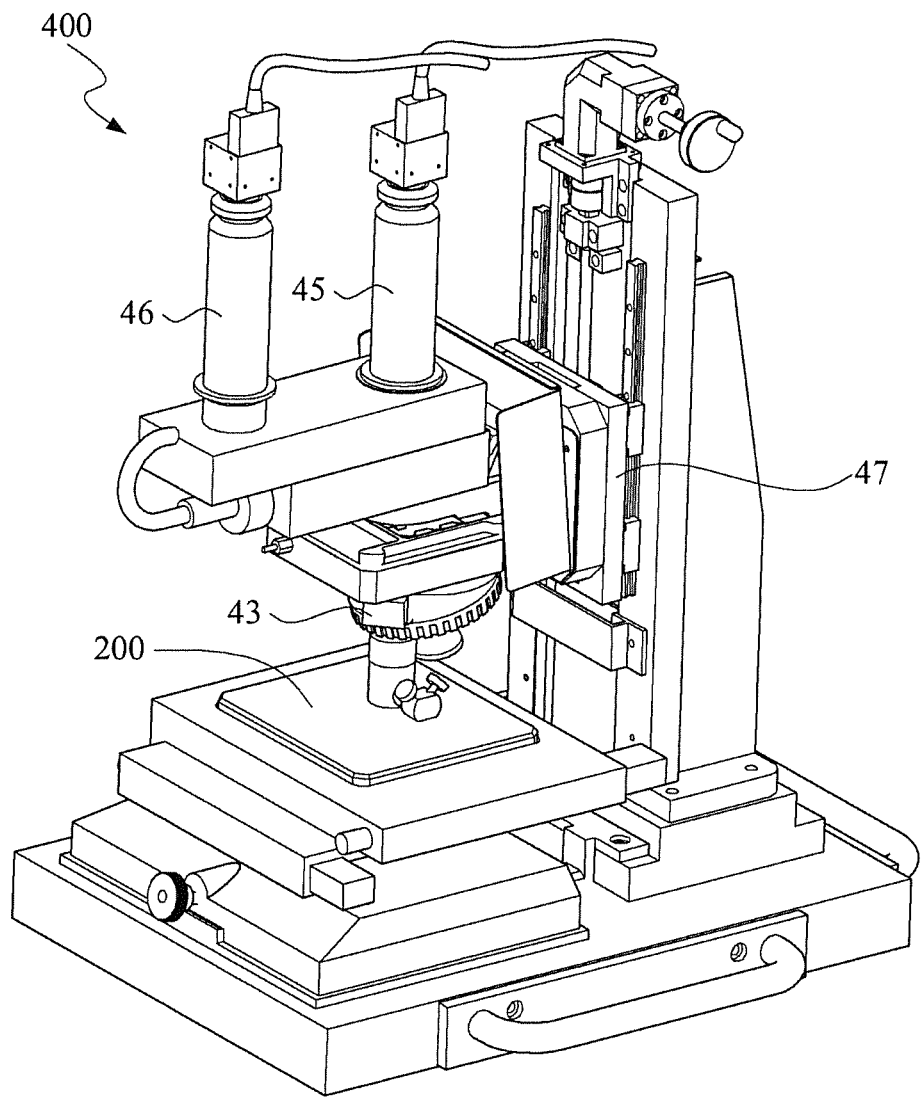
FIG. 3 is a perspective view of the imaging apparatus of the present invention.

Referring to FIGS. 2 and 3, wherein FIG. 2 shows a schematic drawing of an imaging apparatus of the present invention while FIG. 3 is a perspective view of the imaging apparatus of the present invention. As illustrated, the imaging apparatus 400 of the present invention is used for scanning an object 200, includes a light source 41, a first beam splitter 42, an objective lens unit 43, a second beam splitter 44, a monochrome image detection device 45 and an image detection device 46. The light source 41 emits a projection beam 51. The first beam splitter 42 is used for reflecting the projection beam 51.

The objective lens unit 43 is disposed at an elevation above the object 200 to be scanned, includes a reflection reference surface 431 for reproducing the projection beam 51 into a measurement beam 52 and a reference beam 53 such that the measurement beam 52 is radiated onto an outer surface of the object 200 so as to generate a first reflection beam 54. The reference beam 53 is reflected from the reflection reference surface 431 as a second reflection beam 55, which mixes with the first reflection beam 54 to pass through the first beam splitter 42, thereby forming an operating beam 56. The imaging apparatus 400 of the present invention further includes an actuator 47 coupled operably to the objective lens unit 43 such that positions of the objective lens unit 43 for scanning the object can be varied. Note that the objective lens unit 43 consists of a microscopic interferometer and a microscopic objective lens unit. Since the structure of the objective lens unit 43 is known in the art, a detailed description thereof is omitted herein for the sake of brevity.

The second beam splitter 44 is disposed at an elevation above the first beam splitter 42 for modulating the operating beam 56 into a first sub-beam 57 and a second sub-beam 58. The monochrome image detection device 45 is disposed transversely to an optical path of the first sub-beam 57, which passes through a first interference region so as to obtain an interferometric image with the monochrome image detection device 45 from the first interference region. Note that the first interference region is caused due to interference between the first reflection beam 54 and the second reflection beam 55.

The image detection device 46 is disposed transversely to an optical path of the second sub-beam 58, which passes a second interference region to form a non-interferometric image from an outer surface of the second interference region. Note that the second interference region is caused due to interference between the first reflection beam 54 and the second reflection beam 55. In this embodiment, the imaging apparatus 400 of the present invention further includes a reflection member 48 for reflecting the second sub-beam 58 from the second beam splitter 44 onto the image detection device 46. In addition, the image detection device 46 further includes an extension tube for shifting a focus position of an image of the object being scanned. Preferably, the image detection device 46 is selected from one monochrome image capturing device or a multi-color image capturing device so as to obtain monochrome image or multi-color image.

Figure 4:
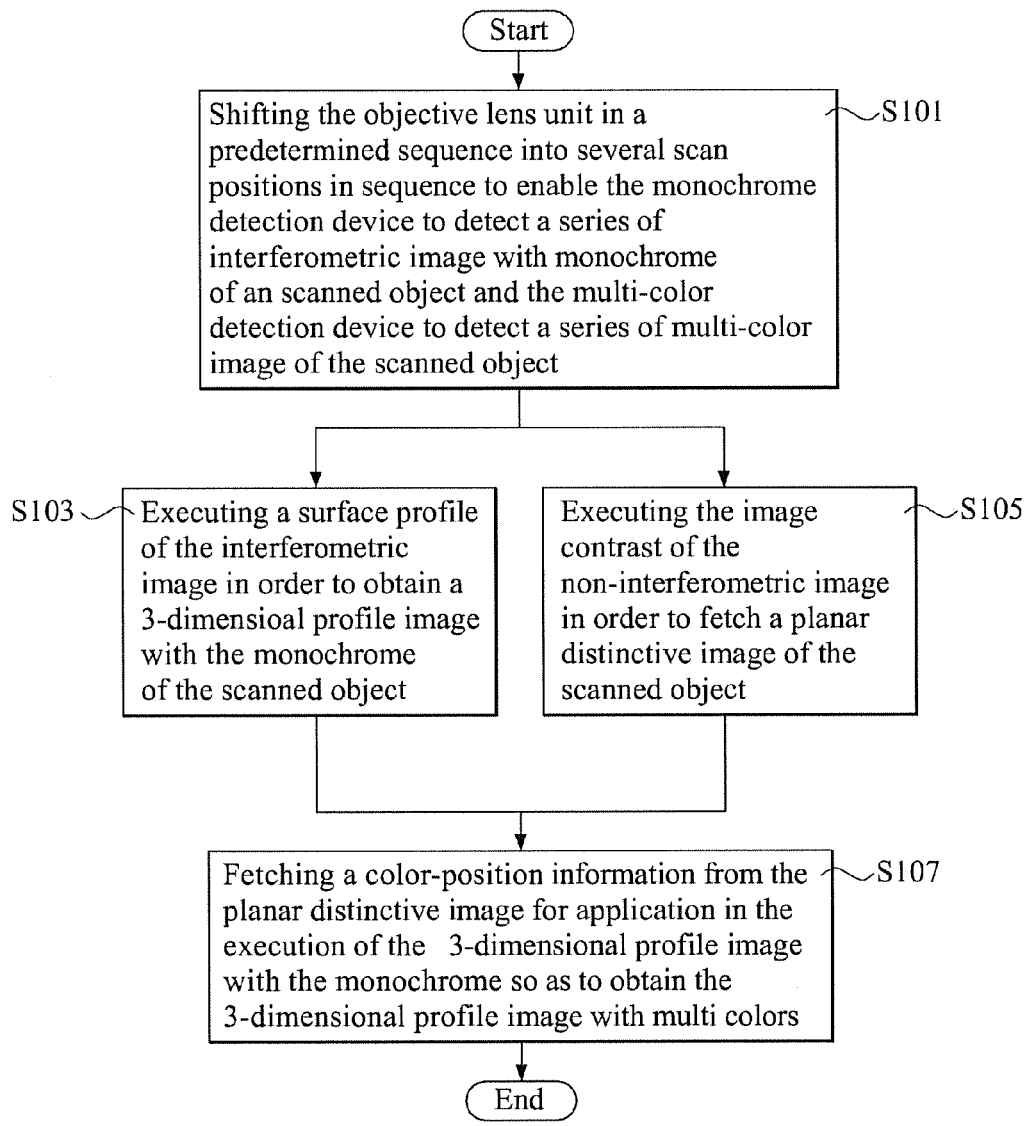
FIG. 4 shows a block diagram illustrating the steps forming an imaging method employing the imaging apparatus of the present invention.

FIG. 4 shows a block diagram illustrating the steps forming an imaging method employing the imaging apparatus 400 of the present invention for scanning the object 200. The imaging method accordingly includes the following steps.

S101: The objective lens unit 43 is shifted into a plurality of scan positions in accordance with a predetermined sequence so that the monochrome image detection device 45 can detect the first sub-beam 57 corresponding to a respective one of the scan positions so as to obtain a series of the interferometric image with the monochrome of the scanned object 200. At the same time, the image detection device 46 detects the second sub-beam 58 corresponding to the respective one of the scan positions so as to obtain a series of the non-interferometric image of the scanned object.

S103: Execute a surface profile of the interferometric image in order to obtain a 3-dimensional profile image with the monochrome of the scanned object 200. In this step, the 3-dimensional profile image with the monochrome is the same as the prior art method.

S105: Execute the image contrast of the non-interferometric image in order to fetch a plurality of resolution parts from the series of the non-interferometric image, a combination thereof forming at least one or a series of planar distinctive image of the scanned object 200. Since the image detection device 46 captures the non-interferometric images from an outer surface of the second interferometric region of the second sub-beam 58, each of the non-interferometric images is free from the interference fringe. The image contrast execution is conducted on each of the non-interferometric images such that every single non-interferometric image is free from the interference fringe and the combination thereof forming the planar distinctive image with a relatively high depth of field.

S107: In the event, the image detection device 46 is a multi-color image capturing device, the imaging method further comprising a step of fetching a color-position information from the planar distinctive image for application in the execution of the 3-dimensional profile image with the monochrome so as to obtain the 3-dimensional profile image with multi colors.

Figure 5:
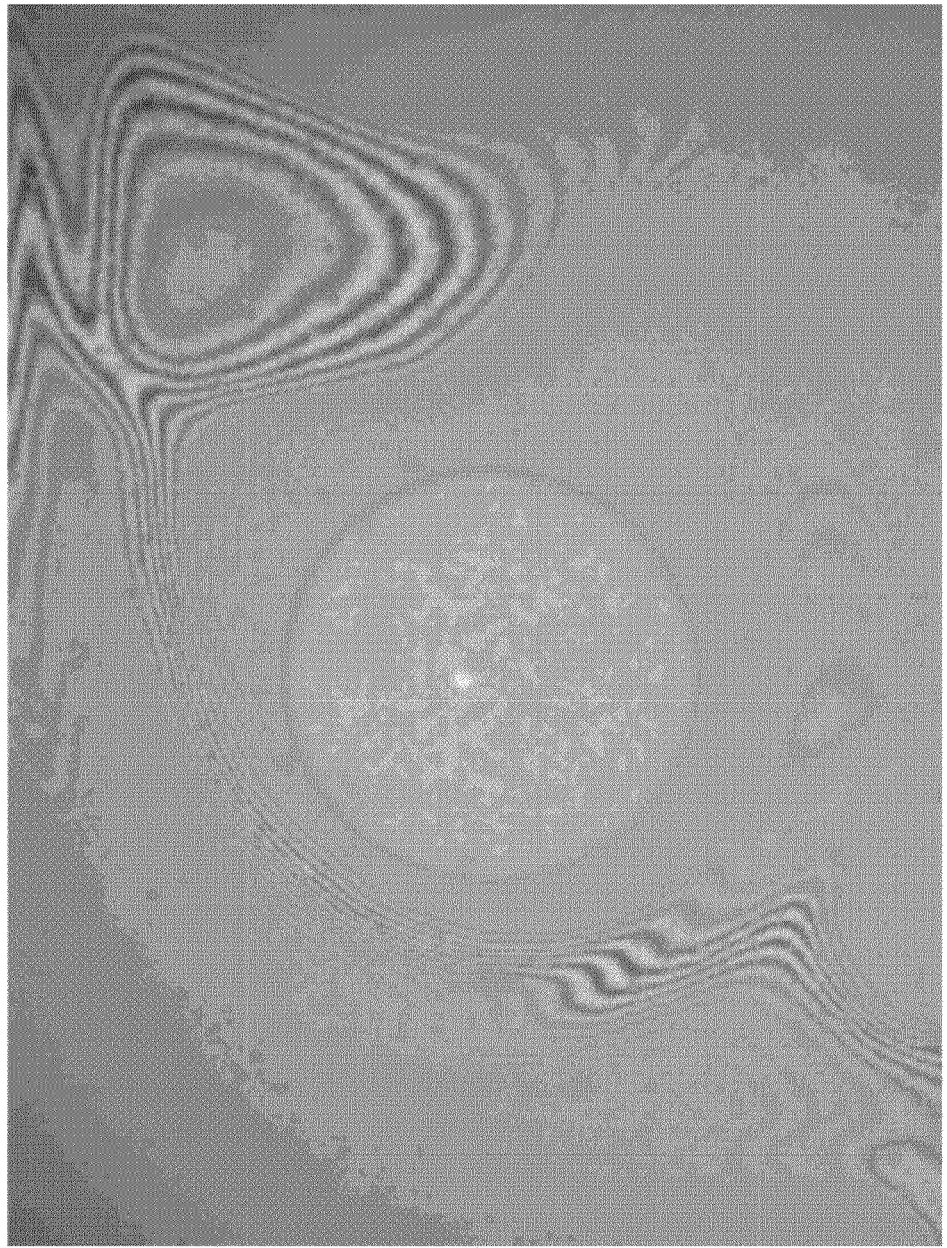
FIG. 5 shows an interferometric image with a monochrome captured by the imaging apparatus of the present invention.
Figure 6:
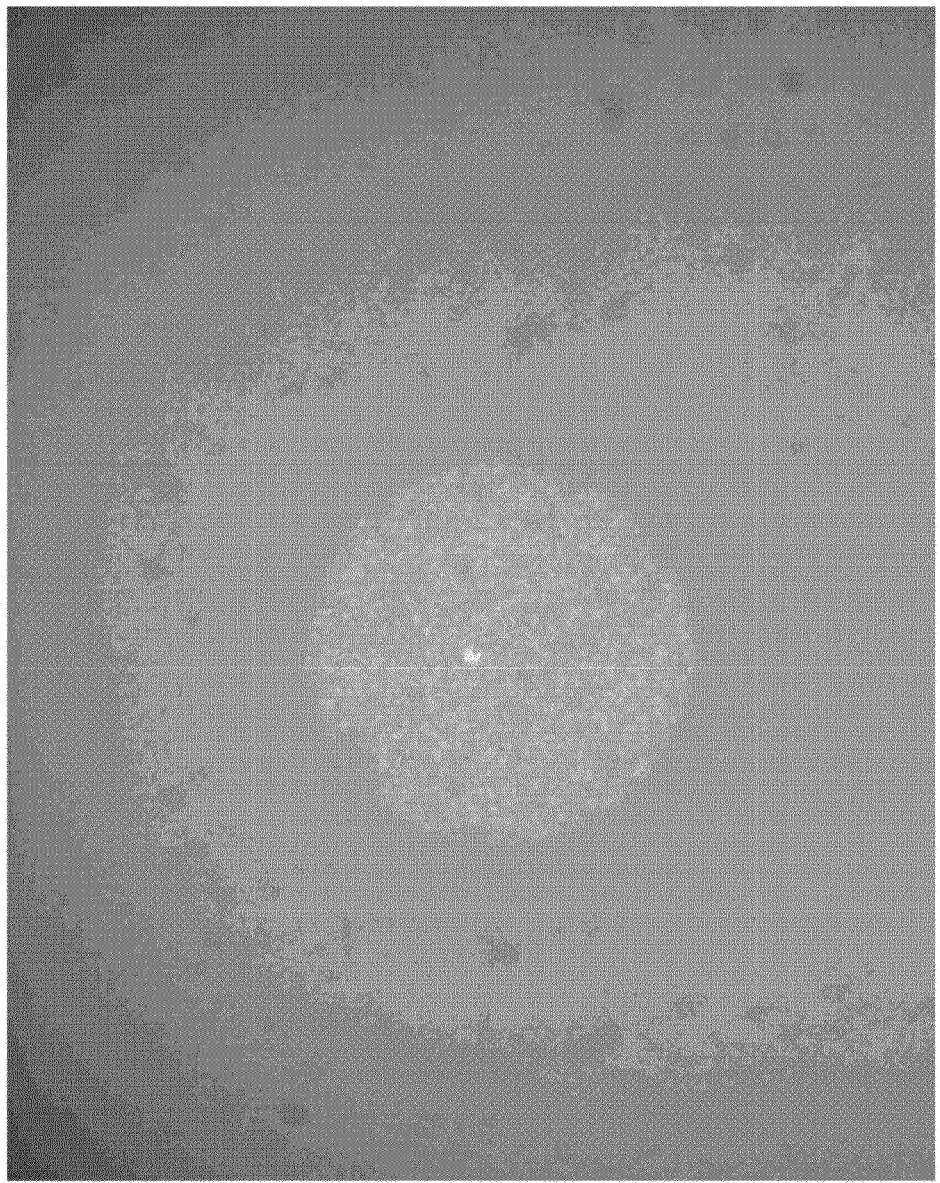
FIG. 6 shows a non-interferometric image captured by the imaging apparatus of the present invention.
Figure 7:
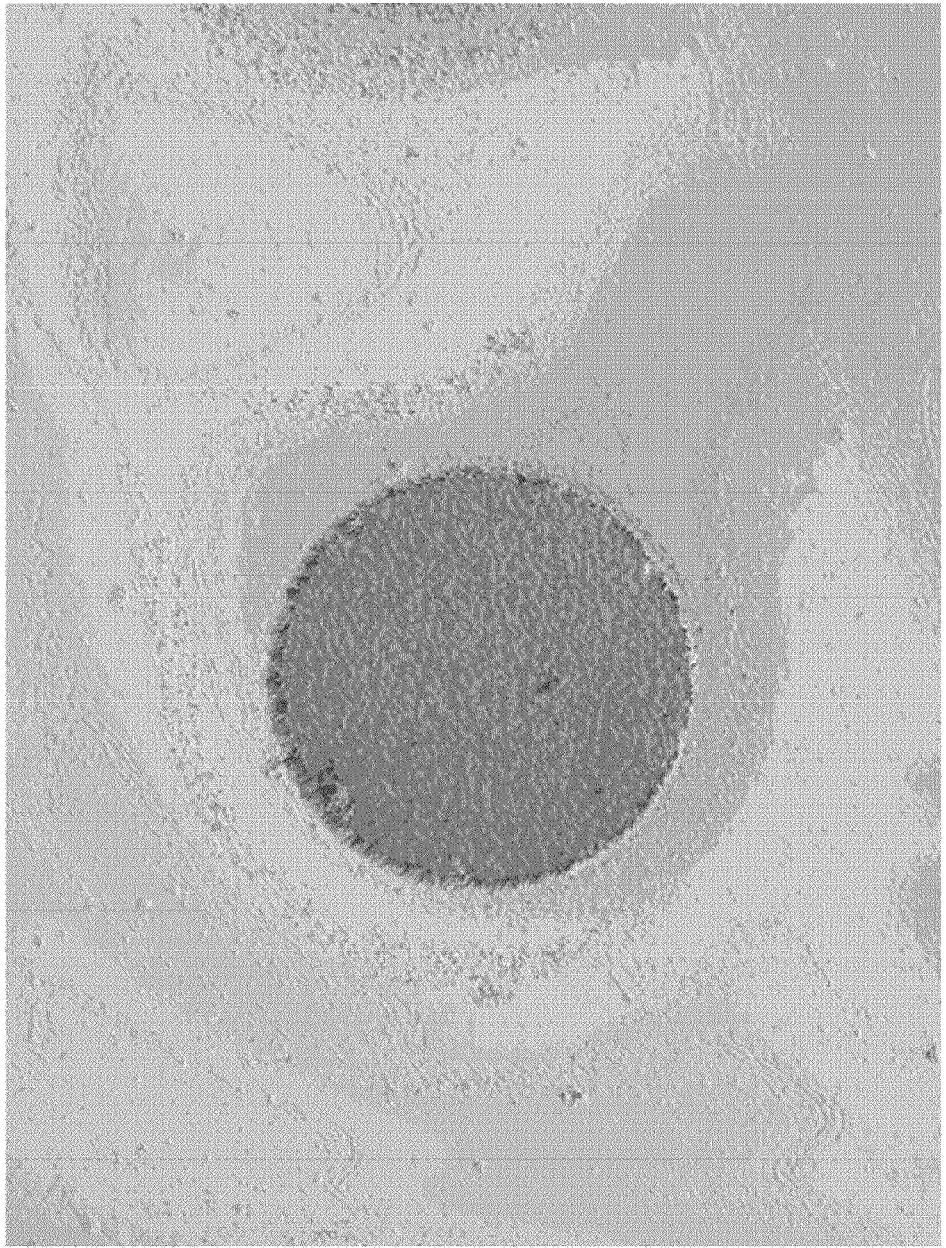
FIG. 7 shows a 3-dimensional profile image of an object to be scanned captured by the imaging apparatus of the present invention.

Referring to FIGS. 5, 6 and 7, wherein FIG. 5 shows an interferometric image with monochrome captured by the imaging apparatus of the present invention, FIG. 6 shows a non-interferometric image captured by the imaging apparatus of the present invention while FIG. 7 shows a 3-dimensional profile image of a scanned object captured by the imaging apparatus of the present invention. When compared with the prior art imaging apparatus 100 and the method, it is obvious that the present imaging apparatus includes the monochrome image detection device 45, the image detection device 46 and the second beam splitter 44, which enables the former two devices to simultaneously form the interferometric image with the monochrome and the non-interferometric image. Thus, after shifting the objective lens unit into several scan positions, the 3-dimensional profile image with the monochrome and the planar distinctive image can be simultaneously obtained. In addition, In the event, the image detection device 46 is a multi-color image capturing device, the multi-color planar distinctive image and the 3-dimensional profile image with multi colors can be simultaneously obtained.

In other words, in accordance with the present invention, no additional image scanning actions are required for simultaneously obtaining the color-position information and the 3-dimensional profile image and hence the multi-color planar distinctive image has a relatively high depth of field. When compared with the prior art imaging apparatus and method, the present apparatus can provide more reference information about the scanned object 200.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging apparatus comprising:
   a light source for emitting a projection beam;
   a first beam splitter for reflecting said projection beam;
   an objective lens unit having an interferometer and objective lens, said objective lens unit being adjustable between a plurality of configurations and disposed above an object to be scanned, including a reflection reference surface capable of splitting said projection beam into a measurement beam and a reference beam, said measurement beam projecting onto an outer surface of the object to be scanned so as to generate a first reflection beam, said reference beam reflected from said reflection reference surface as a second reflection beam, which mixes with said first reflection beam to pass through said first beam splitter, thereby forming an operating beam;
   a second beam splitter disposed above said first beam splitter for modulating said operating beam into a first sub-beam and a second sub-beam;
   a monochrome image detection device disposed transversely to an optical path of said first sub-beam for obtaining an interferometric image containing an interference fringe from a first interference region responsive to said objective lens unit being in at least a first configuration, said first interference region being formed due to interference caused between said first reflection beam and said second reflection beam;
   an image detection device disposed in an optical path of said second sub-beam for obtaining a non-interferometric image free from any interference fringe from the outer surface of a second interference region responsive to said objective lens unit being in at least a second configuration, said second interference region being formed due to interference caused between said first reflection beam and said second reflection beam.

2. The imaging apparatus according to claim 1, further comprising an actuator coupled operably to said objective lens unit.

3. The imaging apparatus according to claim 1, further comprising a reflection member for reflecting said second sub-beam from said second beam splitter onto said image detection device.

4. The imaging apparatus according to claim 1, wherein said image detection device further includes an extension tube mounted between said image detection device and a main support structure for shifting a focus position on said image detection device of a target image of the object being scanned.

5. The imaging apparatus according to claim 1, wherein said image detection device is a monochrome image capturing device.

6. The imaging apparatus according to claim 1, wherein said image detection device is a multi-color image capturing device.

7. An imaging method applied in an imaging apparatus provided with an objective lens unit for scanning an object via the objective lens unit, comprising the steps of:
   establishing an imaging apparatus comprising:
   a light source for emitting a projection beam;
   a first beam splitter for reflecting said projection beam;

an objective lens unit having an interferometer and objective lens, said objective lens unit being adjustable between a plurality of configurations and disposed above an object to be scanned, including a reflection reference surface capable of splitting said projection beam into a measurement beam and a reference beam, said measurement beam projecting onto an outer surface of the object to be scanned so as to generate a first reflection beam, said reference beam reflected from said reflection reference surface as a second reflection beam, which mixes with said first reflection beam to pass through said first beam splitter, thereby forming an operating beam;

a second beam splitter disposed above said first beam splitter for modulating said operating beam into a first sub-beam and a second sub-beam;

a monochrome image detection device disposed transversely to an optical path of said first sub-beam for obtaining an interferometric image containing an interference fringe from a first interference region responsive to said objective lens unit being in at least a first configuration, said first interference region being formed due to interference caused between said first reflection beam and said second reflection beam;

an image detection device disposed in an optical path of said second sub-beam for obtaining a non-interferometric image free from any interference fringe from the outer surface of a second interference region responsive to said objective lens unit being in at least a second configuration, said second interference region being formed due to interference caused between said first reflection beam and said second reflection beam;

shifting the objective lens unit into a plurality of scan positions in a predetermined sequence;

detecting with a monochrome image detection device a first sub-beam corresponding to a respective one of said scan positions so as to obtain at least one interferometric image and a series of said interferometric image from said monochrome image detection device;

detecting with an image detection device said second sub-beam corresponding to said respective one of said scan positions so as to obtain at least a non-interferometric image;

executing a surface profile of said interferometric image in order to obtain a 3-dimensional profile image in monochrome;

executing image contrast of said non-interferometric image in order to obtain a plurality of resolution parts from said non-interferometric image, a combination thereof forming at least one and a plurality of planar distinctive image.

8. The imaging method according to claim 7, wherein in the event said image detection device is a multi-color image detection device, the method further comprising a step of:

fetching color-position information from said planar distinctive image for application in the execution of said 3-dimensional profile image with said monochrome so as to obtain said 3-dimensional profile image with multi-color.

* * * * *